March 19, 1957      G. C. CORLEY      2,785,814
PANEL CART
Filed Nov. 12, 1954      2 Sheets-Sheet 1
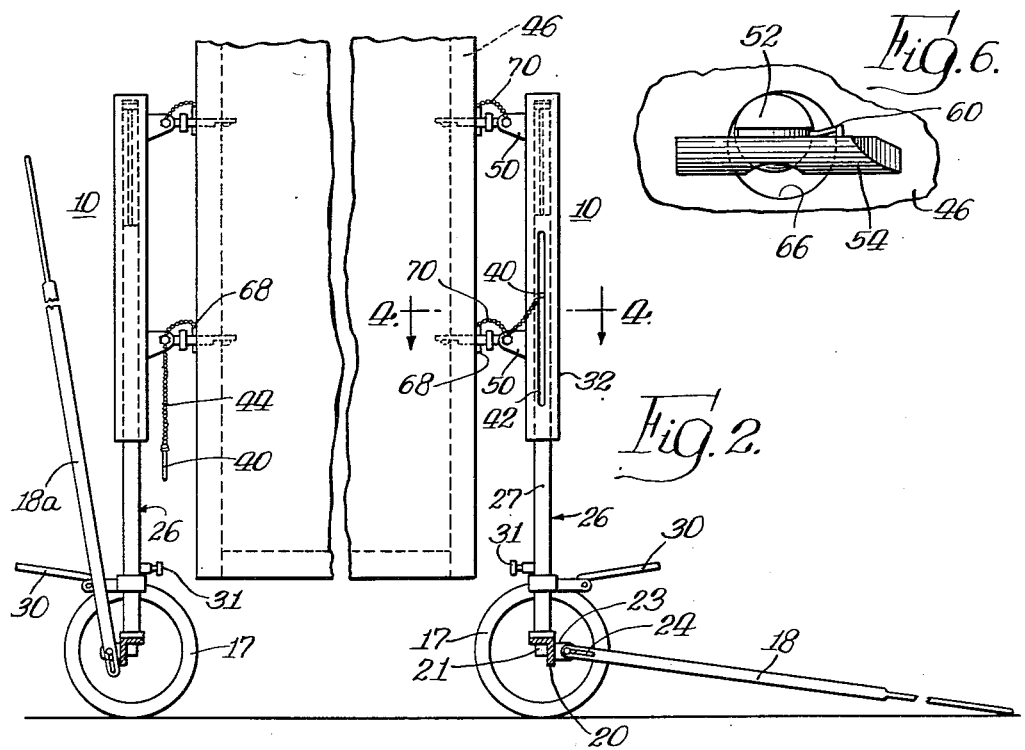
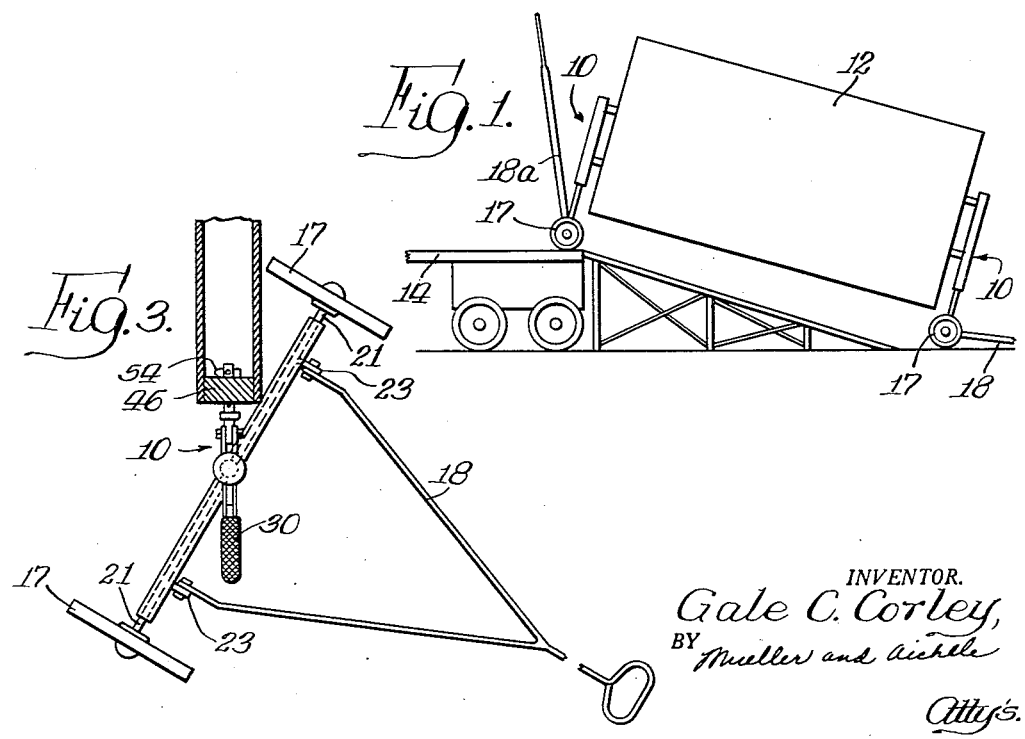
INVENTOR.
Gale C. Corley,
BY Mueller and Aichele
Attys.

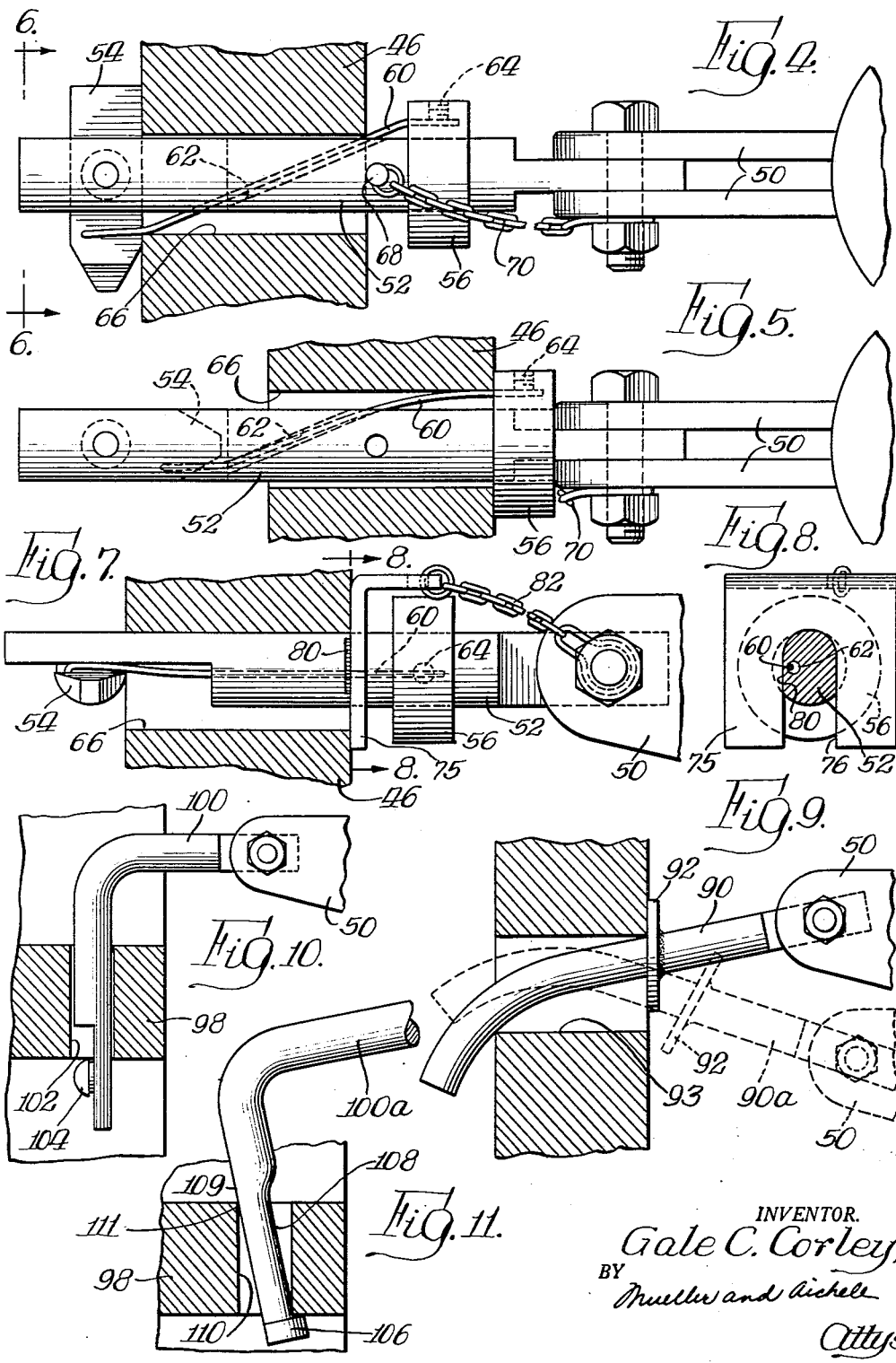

United States Patent Office 2,785,814
Patented Mar. 19, 1957

2,785,814

PANEL CART

Gale C. Corley, Valparaiso, Ind.

Application November 12, 1954, Serial No. 468,229

10 Claims. (Cl. 214—390)

This invention relates generally to apparatus for handling prefabricated building panels and more particularly to an improved cart for use in moving and positioning such building panels.

In the prefabricated building industry it is common to transport large preformed portions of the building by truck or the like to the place of erection and then, of course, to unload the rather ponderous panels for assembly. Due to the size and weight of such panels, it is desirable that suitable apparatus be used to expedite the work. My prior Patent No. 2,636,623 issued April 28, 1953, discloses and claims apparatus which is suitable for positioning and transporting such building panels in a successful manner. However, to be most effective such apparatus should be quickly attachable to a panel as well as quickly detachable therefrom so that a minimum of time will be required. Furthermore, it is advantageous to have a panel cart which is maneuverable and simply operated so that but few workers are necessary to use the equipment for the unloading and positioning operation thereby reducing the cost of the activity.

Accordingly, it is an object of the present invention to provide a cart which may be secured to and detached from building panels through simple and expedient operations.

Another object is to provide a panel cart for transporting prefabricated building panels which may be used with panels of different types.

A further object of the invention is to provide a panel cart and hoist apparatus which is maneuverabe for successful use by a minimum of workers and which is adapted to support a panel when unattended by workers.

Still another object of the invention is to provide a panel cart and hoist mechanism which is adapted to be firmly locked to a prefabricated building panel by the mere lifting of a panel for the purpose of transporting the same.

A feature of the invention is the provision of a panel cart having a wheeled carriage and an extensible vertical support with pivotally mounted support arms disposed in spaced relation on the vertical support and having catch portions thereon to lock the same in preformed apertures in the frame of a building panel.

Another feature is the provision of such a panel cart having a pivotal vertical support and a removable locking device for the vertical support so that it may be pivoted for maneuverability of the cart or locked in fixed position to restrict undesirable movement of the cart when the cart is unattended so that it will hold a panel in a desired position.

A further feature is the provision of such a panel cart and hoist in which the support arms have catch portions at the ends thereof and stop portions spaced therefrom so as to engage a frame member of a panel on opposite sides of an aperture therein when the support arm is inserted in the aperture and is raised by the extensible vertical support.

Still another feature of the invention is the provision of such a panel cart and hoist in which the support arms have pivotally mounted end portions, a removable stop member spaced from the end portion, and a slidable control mechanism for pivoting the end portion from a position adjacent the stop member so that an enclosed panel may be supported by insertion of a support arm in an aperture in the panel frame and engagement of opposite sides of the frame by the end portion and the stop member.

Further objects, features and the attending advantages thereof will be apparent upon consideration of the following description when taken in conjunction with the accompanying drawings in which:

Fig. 1 illustrates a pair of carts as used in unloading a building panel;

Fig. 2 is a sectional elevational view showing attachment of the carts to a panel;

Fig. 3 is a top view of a cart affixed to a building panel;

Fig. 4 is a sectional view of a support arm along the lines 4—4 of Fig. 2;

Fig. 5 is a view similar to that of Fig. 4 but with the support arm prepared for removal from the panel frame;

Fig. 6 is a view along the lines 6—6 of Fig. 4;

Fig. 7 is a side sectional view of the support arm;

Fig. 8 is a sectional view along the lines 8—8 of Fig. 7;

Fig. 9 is a sectional view through the frame of a panel showing an alternate construction of the support arm;

Fig. 10 is a sectional view of a support arm as used in transporting an open panel having horizontal frame members; and Fig. 11 is a view similar to that of Fig. 10 showing a modified form of the support arm of Fig. 10.

The panel hoist and cart of the present invention includes a carriage having wheels, a handle and a vertical support secured to the carriage. The vertical support comprises an outer member mounted in pivotal relation with respect to an inner member, with the outer member being extensible by a suitable jack. A panel may be fastened to the extensible member by means of elongated support arms pivotally mounted on the outer member, the support arms being adapted to be positioned and secured in corresponding apertures in the frame of the building panel. To support a panel by a horizontal member of the panel frame, stop portions are formed on the ends of support arms so that with an arm positioned in an aperture of the frame, the inside of the frame may be engaged under the panel weight as the extensible member of the vertical support is raised to lift the panel. To support a panel by a vertical member of the panel frame, the support arm may include a bent end portion to engage the inside of the frame when the support arm is positioned in an aperture in the frame, and a fixed stop member spaced from the bent end portion to engage the outside of the frame. The panel is thus secured to such a support arm when the extensible member of the vertical support is raised and the weight of the panel causes engagement of the bent end portion and the fixed stop member.

In another form the support arm may include a pivotal member on the end thereof with the member being operated by means of a control wire extending through the arm and connected to slidable means on the arm. A removable stop member is also used on the outside of the frame to fix the support arm in an inward direction and to prevent operation of the slidable means. Detachment of the stop member, however, then permits movement of the slidable means and pivoting of the end portion so that the support arm may be withdrawn from the frame aperture in detaching the panel from the cart.

Fig. 1 illustrates the use of a pair of carts 10 during the unloading of a prefabricated building panel 12 from a trailer 14. Briefly, the steps of such an operation include attachment of the cart to the panel, and raising the panel to a position above the top of the wheels 17 after which workers may wheel the panel to a desired location by means of the handles 18. When the panel is in such a position as illustrated in Fig. 1, the wheels may be turned during maneuvering of the panel and they will not strike the lower side thereof.

Figs. 2 and 3 illustrate the panel carts in more detailed fashion, and it may be seen that they consist of a carriage formed by an angle member 20 to the ends of which are affixed axles 21 supporting the wheels 17. The handle 18 has spaced arms pivotally mounted on brackets 23 which are secured to the angle member 20. It is preferable to attach the handle arms to the brackets 23 by means of suitable bolts or rivets passing through slots 24 in the ends thereof so that the handle may be supported in an upright position as shown by handle 18a in Fig. 2. Thus if a panel is temporarily stored on the carts, the handles may be positioned in a compact form so as not to require an undue amount of space.

Secured to the center of the angle bracket 20 is an extensible vertical support 26. This support includes an inner portion 27 which incorporates a jack or hoist operable by foot pedal 30 to raise the outer portion 32 of the vertical support. Release valve 31 permits lowering of the portion 32 by releasing the jack pressure. The outer portion 32 is pivotal with respect to the inner portion 27 so that the carriage may be turned as shown in Fig. 3 for maneuvering during the unloading operation. However, in some instances, such as when the panel is temporarily left supported on the carts or when proper steering may be effected only by turning one of the carts, provision is made to lock the inner and outer portions with respect to each other. A pin of member 40 may be inserted in a suitable aperture in the inner member 27 through an elongated slot 42 along the outer member 32 in order to lock these members. The pin member 40 may be maintained in a convenient position by attaching it to the cart by means of a chain 44.

Figs. 4–7 illustrate one form of a support arm suitable for use in transporting prefabricated panels which are enclosed on both sides so that only one surface of a frame member 46 at an end of the panel is available. Such support arms are supported on brackets 50 which are secured in spaced relation to the outer member 32 (Fig. 2). The support arms take the form of a stud member 52 which is secured to the bracket 50 so as to be pivotal in a vertical plane. A pivotally mounted end member 54 is disposed on the free end of the stud member 52 and is pivotal to a position transverse of the stud member and is preferably mounted so as to be pivotal in a horizontal plane when the stud member is horizontally positioned.

A short annular sleeve 56 is mounted in slidable relation on the stud member 52 and a stiff wire 60 extends through an aperture 62 in the stud member 52 with one end attached to the end member and the other end secured to the sleeve 56 by means of set screw 64. Therefore, it may be seen that by moving the slidable sleeve 56 along the stud member 52, the end member 54 may be positioned coextensive with the stud member as illustrated in Fig. 5 or transverse thereof as illustrated in Figs. 4 and 6.

In using the apparatus described, a cart is wheeled up to the end of a panel which has preformed apertures in the end thereof, which apertures are spaced to correspond to the spaced relation of the support arms or stud members 52, and these members are positioned within such apertures, e. g. aperture 66, as shown in Fig. 5. If the apertures do not correspond exactly to the height of the stud members, it is of course obvious that the vertical support may be raised or lowered until these heights correspond. After the stud member is positioned within an aperture in the frame of a panel, the end member 54 may be turned to a position transverse of the stud member by moving the sleeve 56, and this will secure the stud member within the aperture. A stop pin 68 is then inserted in a suitable aperture between the outside of the panel frame 46 and the slidable sleeve 56 so that both the inside and the outside of the frame are secured to the support arm. A chain 70 may be attached to the pin 68 and to the bracket 50 so that the pin will be in a convenient position for use.

When a pair of panel carts have been secured to a panel as described, the vertical support may be raised by operation of foot pedal 30 so that the panel will be supported entirely by the carts and may be transported to a desired position for use. In order to detach the panel from a cart, it is only necessary to lower the vertical support 26 so that the panel is no longer supported by the carts and then to remove pin 68 and push the cart toward the frame member 46 so that the frame engages the sleeve 56 (Fig. 5) in order to turn the end member to a position co-extensive with the stud member 52. Then, of course, this member may be easily removed from the aperture 66 in the panel frame.

Figs. 7 and 8 illustrate an alternate form for the outer stop member or stop pin 68. This comprises a bracket 75 having a U-shaped slot 76. The bracket may be positioned against the outside of the frame of a panel in suitable notches 80 cut in the sides of the stud member 52. A chain 82 may also be used to keep the bracket in a convenient position for use.

A simplified form of the support arm is illustrated in Fig. 9. This may be seen to consist of an elongated shaft 90 pivotally supported on the bracket 50 and having a curved end portion and an outer stop member 92 supported in spaced relation from the curved end portion. In using this form of the support arm, the panel frame must contain an aperture 93 large enough to pass the curved end portion of the shaft 90 but not so large as to pass the outer stop member 92. One or more shafts may then be positioned in the panel as illustrated by dotted lines at 90a, after which the vertical support may be raised to position the support arm as illustrated in the solid line drawing so that the curved portion of the shaft 90 engages the inside of the frame 94, and the outer stop member 92 engages the outside of the frame. It is apparent that this attaching operation is very simple, but yet that the panel will be firmly supported by this structure.

Some panels used in prefabricated buildings are not enclosed on both sides, and have frame members which are horizontally disposed along the panel. Roof and ceiling panels are often formed in this way. It is possible to use the cart of the present invention to transport such panels as illustrated in Figs. 10 and 11. The brackets 50 supported on the outer member 32 may be spaced a distance equal to the spacing of the frame members 98 of such a panel, for example 16 inches, and aperture 102 may be formed in the frame members at a short distance from the ends thereof. The right angle support arm 100 of Fig. 10 may be lowered into such a frame aperture 102 by lowering the extensible vertical support after which the end member 104 is turned transverse of the support arm and the panel is raised to be transported as previously described. The support arm 100 is, of course, formed at a right angle since the frame members are horizontally disposed in the panels under consideration, and it is unnecessary to provide remote operation of the end member 104 since such panels are not enclosed and this member may be turned by hand.

Support arm 100 may also be modified as shown at 100a in Fig. 11 in which the end portion 106 is shown stepped into a section 108 of reduced cross-section. The section 108 is of a length somewhat greater than the thickness of the frame member 98 so that when this support arm is positioned in the aperture 110 and the extensible support is raised, the weight of the panel causes the arm 100a to pivot until the back edge 109 thereof engages the aperture 110 at point 111 and the catch portion thus formed by the end portion 106 prevents removal of the arm and supports the panel on the cart.

The described invention provides therefore a panel hoist and cart which may be easily attached to and detached from a prefabricated building panel. The support arms need only be positioned in apertures in a panel and engaged therewith after which the panel may be lifted and moved by the cart. Furthermore, the cart is pivotal for maneuverability but the pivot may be locked when the steering feature is not used.

What is claimed is:

1. A panel cart for hoisting and transporting a building panel having frame means with apertures therein, said cart including in combination, a wheeled carriage with a vertically extensible support secured thereto and a pair of elongated support arms pivotally supported in spaced relation on said extensible support, said support arms being adapted to be positioned respectively extending through the apertures in the frame means of a panel and said support arms having stop portions thereon for retaining the same within the apertures when said extensible support is extended for hoisting and transporting the panel.

2. A cart mechanism for hoisting and transporting a building panel having frame means, said cart mechanism including in combination, a carriage with a horizontal axle carried by two spaced wheels and having a handle and a vertical support secured thereto, said vertical support including inner and outer portions pivotal with respect to each other and means to elevate said outer portion with respect to said inner portion, said inner portion having an aperture therein and said outer portion having a slot extending lengthwise thereof and communicating with said aperture when said portions are in predetermined pivotal relation, removable stop means adapted to be positioned in said aperture and slot for locking said inner and outer portions against relative rotary movement, and support arms disposed in spaced relation on said outer portion, said support arms including means for securing the same to the frame means of a panel for supporting the same, said support arms further being positioned to support the panel in a position substantially perpendicular to the axle of the wheeled carriage when said vertical support is locked.

3. A cart mechanism for hoisting and transporting a building panel having frame means with an aperture therein, said cart mechanism including in combination, a wheeled carriage with a vertical support secured thereto, said vertical support including inner and outer portions pivotal with respect to each other, said inner portion including a jack device to elevate said outer portion, a handle affixed to said carriage for maneuvering the cart with said inner portion pivoting within said outer portion, said inner and outer portions having apertures therein, a stop peg adapted to be positioned in said corresponding apertures for fixing said inner and outer portions with respect to each other to prevent undesired pivotal movement thereof, and a support arm disposed on said outer portion, said support arm having a pivotal end section which has a first position which permits positioning the arm in the aperture of the panel and a second position in which said end section engages the frame means of a panel to hold the same on said cart for hoisting and transporting the same.

4. A cart mechanism for hoisting and transporting a building panel having frame means with an aperture therein, said cart mechanism including in combination, a wheeled carriage with a vertically extensible support secured thereto and an elongated support arm pivotally supported on said extensible support, said support arm being adapted to be positioned within the aperture in the frame means of a panel and said support arm having a restraining portion on the end thereof for retaining the same within the aperture when said extensible support is extended for hoisting and transporting the panel.

5. A cart mechanism for hoisting and transporting a building panel having frame means with an aperture therein, said cart mechanism including in combination, a wheeled carriage with a vertically extensible support pivotally secured thereto and an elongated support arm pivotally supported on said extensible support, said support arm having an end portion spaced from said extensible support and adapted to be positioned within the aperture in the frame member, said support arm further having a rotatable stop member on said end portion thereof for retaining the same within the aperture when said extensible support is extended for hoisting and transporting the panel.

6. A cart mechanism for hoisting and transporting building panels which have frame members along the ends thereof and spaced apertures through the frame members, said cart mechanism including in combination, a wheeled carriage with a vertically extensible support secured thereto and a pair of elongated support arms pivotally supported in spaced relation on said extensible support, said support arms having bent end portions and fixed stop members disposed in spaced relation from said end portions, said support arms further being adapted to be positioned with said bent end portions extending through the spaced apertures in the frame members with said bent end portions and said stop members rigidly engaging a frame member as said extensible support is extended for hoisting and transporting the panel.

7. A cart mechanism for hoisting and transporting a building panel which has a frame member along an end thereof and an aperture therein, said cart mechanism including in combination, a wheeled carriage with a vertically extensible support secured thereto, a support arm having one end pivotally supported on said extensible support, a pivoted stop member mounted on the other end of said support arm, said stop member being pivotal to positions parallel with said support arm and transverse thereof, slidable means disposed on said support arm adjacent said one end, a control member coupled between said pivotal stop member and said slidable means and extending at least partially within said support arm so that movement of said slidable means causes pivoting of said pivotal stop means, and a fixed stop member removably supported on said support arm so that said support arm may be positioned within the aperture in the frame and said pivoted stop means and said fixed stop means may be positioned to engage opposite sides of the frame member for supporting the panel by said cart mechanism.

8. A cart mechanism for hoisting and transporting a building panel which has frame means along the sides thereof and apertures in the frame means, said cart mechanism including in combination, a wheeled carriage with a vertically extensible support secured thereto, a support arm having one end pivotally supported on said extensible support, a pivoted stop member mounted on the other end of said support arm, said stop member being pivotal to a position parallel with said support arm and transverse thereof, means to pivot said stop member from a position adjacent said one end, and a removable stop member adapted to be supported on said support arm spaced from said pivoted stop member so that said support arm may be positioned within the aperture in the frame means and said pivoted stop means and said removable stop means may be positioned to engage opposite sides of the frame member so that said cart mechanism supports the panel.

9. A cart mechanism for hoisting and transporting a building panel which has frame means along the sides thereof and spaced apertures through the frame means, said cart mechanism including in combination, a wheeled carriage with a vertically extensible support secured thereto and a pair of elongated support arms secured in spaced relation on said extensible support, each of said support arms having pivotally mounted end portions adapted to be pivoted transverse of the associated arm for providing a projection at the end thereof, a removable stop member adapted to be secured on each support arm in spaced relation from the pivotally mounted end portion thereof, said support arms being adapted to be positioned with said end portions extending through the spaced apertures in the frame means with said end portions and said stop members on opposite sides of the frame means as said extensible support is extended for hoisting and transporting the panel.

10. A cart mechanism for hoisting and transporting a building panel which has frame means along the sides thereof and spaced apertures through the frame means, said cart mechanism including in combination, a wheeled carriage with a vertically extensible support secured thereto, said vertically extensible support including inner and outer portions pivotal with respect to each other, means to restrict relative pivotal movement of said inner and outer portions, and a pair of elongated support arms secured in spaced relation to said outer portions, each of said support arms having pivotally mounted end portions adapted to be pivoted transverse of the associated arm for providing a projection at the end thereof, a removable stop member adapted to be secured to each support arm in spaced relation from the pivotally mounted end portion, said support arms being adapted to be positioned with the end portions thereof extending through the spaced apertures in the frame means of a panel, said end portions when pivoted and said stop members engaging opposite sides of the frame means as said extensible support is extended for hoisting and transporting the panel.

References Cited in the file of this patent

UNITED STATES PATENTS

| | | |
|---|---|---|
| 1,239,771 | Collis | Sept. 11, 1917 |
| 1,349,344 | O'Neill | Aug. 10, 1920 |
| 1,356,843 | Waldmann | Oct. 26, 1920 |
| 2,463,381 | Hicks | Mar. 1, 1949 |
| 2,636,623 | Corley | Apr. 28, 1953 |
| 2,662,798 | Kirkpatrick | Dec. 15, 1953 |